United States Patent [19]

Greiner et al.

[11] Patent Number: 4,719,791
[45] Date of Patent: Jan. 19, 1988

[54] INDIVIDUAL FILTER BAG MONITORING SYSTEM FOR BAGHOUSES

[75] Inventors: Gary Greiner, Troutville; Dale A. Furlong, Vinton, both of Va.

[73] Assignee: ETS, Inc., Va.

[21] Appl. No.: 938,516

[22] Filed: Dec. 5, 1986

[51] Int. Cl.$^4$ .................................... G01N 15/00
[52] U.S. Cl. ................................................ 73/38
[58] Field of Search .................................... 73/38, 28

[56] References Cited

U.S. PATENT DOCUMENTS

| | | | |
|---|---|---|---|
| 2,880,819 | 4/1959 | King et al. ............................ | 55/213 |
| 3,033,030 | 5/1962 | Heller .................................. | 73/38 X |
| 3,325,010 | 6/1967 | Sackett ................................ | 73/38 X |
| 3,390,512 | 7/1968 | Hanes .................................. | 55/96 |
| 3,413,855 | 12/1968 | Bloom ................................. | 73/38 X |
| 3,630,004 | 3/1969 | Adair .................................. | 55/273 |
| 3,696,666 | 10/1972 | Johnson et al. .................... | 73/118.1 |
| 3,735,566 | 5/1973 | Laliwala ............................ | 55/273 |
| 3,766,715 | 10/1973 | Archer ................................. | 55/96 |
| 3,877,899 | 4/1975 | Bundy et al. ...................... | 55/272 |
| 3,893,833 | 7/1975 | Ulvestad ............................. | 55/273 |
| 3,934,543 | 1/1976 | Howard ............................... | 340/607 |
| 4,189,724 | 2/1980 | Onuma et al. ...................... | 340/607 |
| 4,193,292 | 3/1980 | Simonsson .......................... | 73/38 |
| 4,233,597 | 11/1980 | Kurz .................................... | 340/626 |
| 4,292,053 | 9/1981 | Remillieux .......................... | 55/96 |
| 4,400,971 | 8/1983 | Tassicker ............................ | 73/28 |

Primary Examiner—Stewart J. Levy
Assistant Examiner—Joseph W. Roskos
Attorney, Agent, or Firm—Bacon & Thomas

[57] ABSTRACT

The present invention provides an apparatus for measuring the pressure drop which occurs between two sides of an orifice plate attached to a filter bag. The apparatus includes a chamber with an orifice plate at one end and a pair of tubular pressure taps located on either side of the orifice plate whereby one tap is located on the upstream side of the orifice plate and the other is located at the downstream side. Both taps have a particular location and configuration to avoid clogging whenever the bags are cleaned. The apparatus is used in a sequentially timed and controlled system for measuring and recording bag performance of many bags in a baghouse. The system is formed by attaching the above apparatus to a plurality of bags in a baghouse and connecting the pressure taps from each apparatus to a sequentially activated and controlled valve system which individually measures the pressure drop at each bag through the use of a single differential pressure-measuring device. The controlled valve system also allows purge gas to pass through the taps while isolating the pressure-measuring device from the taps through which the purged gas is passing. The system also includes a baghouse temperature sensor, a baghouse pressure drop measuring device and a recording device so that individual bag flow and fabric drag can be calculated and recorded.

12 Claims, 10 Drawing Figures

INDIVIDUAL FILTER BAG MONITORING SYSTEM FOR BAGHOUSES

BACKGROUND OF THE INVENTION

Field of the Invention

The present invention relates to the field of baghouse filters and related apparatus. More particularly, it relates to an apparatus for measuring and monitoring numerous aspects of the filtering performance in individual filter bags within a baghouse containing a large number of individual filter bags. An essential feature of the apparatus is a pressure drop sensing device having a unique configuration which provides for the in situ measurements of individual bag performance. The invention also relates to a system which employs the pressure drop sensing device in combination with additional monitoring, measuring and analytical equipment to provide a means for on-stream monitoring of baghouse performance and for providing individual flow data and filter bag pressure drop data which is useful for solving many problems in baghouse filter technology.

BACKGROUND INFORMATION

It is not unusual for a baghouse to contain more than one hundred individual filter bags. The task of monitoring the function of these bags can be a cumbersome and expensive undertaking. Similarly, an effective method for evaluating the performance of different types of bags usually involves a complicated, expensive and time consuming procedure.

These evaluations and the effective monitoring of the baghouse system may be performed by measuring certain variables in the bags within the system. For example, a measurement of the pressure drop gives some data on the functioning of the system. However, for a more complete and more accurate evaluation of baghouse performance, it is desirable to measure more than just pressure drop. Simultaneous measurement of gas flow and pressure drop is required. Of particular importance, especially for the purpose of making side-by-side comparisons of different types of bags, it is desirable to be able to obtain a complete and accurate evaluation of individual bags within the baghouse. Even more important is the ability to make a quick and accurate measurement of the individual bags without having to remove them from the baghouse. Such a measurement is referred to herein as "in situ" measurement.

The present invention provides for an apparatus and method for monitoring the individual, in situ flow of one or more bag filters, within a baghouse which consists of many bags. In order to develop this in situ measuring device and method, certain problems which are characteristic with other known methods of monitoring baghouses, had to be overcome.

One problem relates to the fact that the entire array of bags in a baghouse has near identical pressure drop. As a result of this, the flow of an individual bag will differ from its neighbors if the flow characteristic of the fabric and/or the deposited dust cake differs. In order to identify these differences in flow characteristic, it was necessary in the prior art methods to remove the individual bags from the baghouse and then measure the flow characteristic or permeability at that time. However, the removal process can disturb the dust cake and thereby give misleading results. In addition, these prior methods do not permit the monitoring of changing characteristics on a continuous basis. The present invention overcomes these difficulties in the prior art devices.

It is also important to have the capability to monitor the performance of the individual bags so that problems with specific bags can be identified. It is important when problems occur in a baghouse to be able to evaluate the performance of different types of bags so that one can make an informed decision whether to change the bags. In this regard, it is important to be able to test the bags under actual operating conditions. However, in the prior methods, one would have to replace all the bags or nearly all the bags in any given baghouse or compartment in order to compare the performance of one type of bag with another. Furthermore, one would have to repeat this entire process for each bag being tested. The present invention avoids the problems associated with replacing all the bags by providing the capability for measuring the in situ performance of individual bags. As a result, many different types of bags can be quickly evaluated simultaneously without having to go through the time consuming process of replacing all the bags in a baghouse compartment.

Usually, baghouses must be evaluated because of certain types of problems which can develop in troublesome baghouses. Troublesome baghouses normally exhibit either high or unstable pressure drop, or excess stack emissions. The correction for these problems is often a change of fabric, a change of bag construction, a modification of the cleaning system, or modification of other system design parameters. Often the alternatives available to attempt to solve the problems are many. Inherent in evaluating any change to a baghouse is the need to understand the gas flow capability through the system as these changes are made, and to understand the characteristic of flow versus pressure drop.

In the past, a total compartment or a total baghouse had to be modified and then evaluated. One variable at a time was all that could be properly examined. If more than one variable could be simultaneously evaluated, it would allow the user to choose the best technical approach to solve a particular problem.

Not every problem is solved by merely changing the type of bags and it would be a waste of time and money to change all the bags only to find out afterwards that the problem persists. Likewise, modifications to the hardware should not be undertaken without a thorough evaluation. However, any evaluation which requires modifications of the entire system or major portions thereof, is not economical and often leads to a selection of a system which is less than optimum.

Several techniques have been used in the past to evaluate baghouse design parameters. The use of pilot plants where single variables are sequentially evaluated in an instrumented compartment is effective in getting the generic data but is expensive, time consuming and often does not answer the questions relating to scale up. Fabric testing in the lab attempts to determine residual flow characteristics of various fabrics or bags that have been subjected to different design and operating conditions. Fabric testing provides relative flow capability information at best and except in extreme cases cannot produce the required information. The fabric testing technique has the problem that it does not know the flow history of the fabric and so a fabric that appears in the lab to be very low in flow capability, i.e., blinded, may have become that way as a result of that bag having been operated at a very high gas flow rate because it initially had much higher flow capability.

The outlet poppet dampers have been used as a flow measuring orifice to evaluate the flow differences between compartments, each of which were equipped with one experimental variable. This has met with mixed success. It is very difficult to get good accuracy using outlet dampers and there are questions as to the uniformity of the characteristics between dampers because of the impact of the turbulence and velocities in the common inlet manifold. Other prior art, devices or methods have used a total bag perm machine where one bag at a time within the baghouse is connected to a blower and the volume of air processed with a given pressure drop is monitored. Because the baghouse has to be taken off-line and the bag has to be disturbed, such prior art data is not representative of what is actually occurring on-line, inside the baghouse.

The problems of the prior art are avoided by the present invention which allows simultaneous evaluation of multiple variables within any compartment of the baghouse and which allows for the simultaneous comparison and evaluation of these variables. With the present invention, one can monitor individual bag flow and tube sheet pressure drop, or bag fabric pressure drop for a significant number of bag locations. One can also evaluate the impact of fabric construction, bag construction, and cleaning energy change on individual bag performance by monitoring the individual bag flow and flow resistance. These measurements can then be extrapolated to determine total system flow and pressure drop capabilities, assuming all areas of the baghouse are converted to that variable.

The individual bag flow monitor system consists of sensors, a signal conditioning module, a data collection module, and all necessary hardware connections. A modified knife edge orifice is used as the sensor rather than using large Venturi type monitors of the type used in pipes and which have also been suggested for use in baghouses.

The use of the modified knife edge orifice in pulse jet applications is relatively simple. One must merely maintain sufficient opening to eliminate any influence on the cleaning energy and establish the orifice pressure drop at the appropriate level.

For reverse air and shaker type baghouses, the problems become more complex. A means for attaching the sensors to the existing thimble or tube sheet, a method to re-attach the bag, and two sensing ports are required—one below and one above the sensor plate. Both sensing ports must be designed and located such that they will remain clear in the dirty environment. While the pulse jet sensor is located on the clean side of the fabric, the reverse air and shaker sensors are located on the dirty side.

Not only must the sensor ports be maintained clear during normal operation, they also must not become clogged during the cleaning cycle. The size of the orifice hole must be sufficient to allow the material cleaned from the bags to pass through into the hoppers.

A sensor capable of monitoring individual bag flow through a reverse air or shaker type filter bag where inside-out dust collection is employed, must accomplish several functions. First, it must provide a measurable pressure drop signal across the expected bag flow range. Typically a minimum signal of greater than 0.005 inches of water is desired. Second, the pressure drop of the sensor should be minimized so that it does not significantly affect the bag flow. Typically, 0.25 inches of water is established at design flow. It may, in some cases, be desirable to intentionally restrict bag flow by designing in higher sensor pressure drop. Third, the sensor should have the capability of discharging dust cleaned from the bags without clogging or causing excess bag wear. Fourth, the sensor pressure lines must be maintained in an open and unobstructed condition for accurate and reliable pressure readings. The present invention provides a sensor having the above mentioned capabilities.

SUMMARY OF THE INVENTION

The present invention avoids the problems associated with the prior art bag flow monitoring systems by providing an improved pressure sensing device for individual filter bags within a baghouse. In particular, the pressure sensing device is designed for monitoring individual bag flow through a reverse air or shaker type filter bag where inside-out dust collection is employed. A pressure sensor is also provided for use in outside-in flow, pulse-cleaned baghouses.

The pressure sensing device is used to provide data for a monitoring system which collects gas flow data from individual filter bags, monitors the gas flow data, and stores the data. The monitoring system also analyzes individual bag gas flows at multiple bag locations within the same collector on a continuous programmable basis. Computer based hardware and software may be used to assist the analysis of the gas flow at the individual multiple bag locations.

The pressure sensing device which is essential for measuring the gas flow at the individual bag locations comprises an orifice having a pair of tubular pressure taps; an upstream tap and a downstream tap with respect to the orifice. The downstream tap is of a particular trombone loop configuration so that dust which is periodically discharged from the bags, does not enter the tubes. The sensor has sidewalls of sufficient height so that their height exceeds the maximum height of dust which can collect against the sidewalls; which height is determined by the dust's angle of repose. Each tap is connected to a valve. When the valve is in one position, the tap is connected to a source of purge gas which flows through the tap to prevent dust from entering it. When the valve is in the other position, the flow of gas through the taps is cut off and the tap is connected to a pressure measuring device, such as a differential pressure transducer so that the pressure in each tap can be measured to provide a measurement of the pressure drop, dH, across the orifice.

A single differential pressure measuring device, such as a pressure differential transducer, is used to measure all of the individual pressures which are sensed by the pressure sensing taps. The use of a single pressure differential transducer is important because the pressure drop across the orifice is very small and an accurate measurement of the individual pressure drop for each bag could otherwise be lost due to the differing sensitivity of these types of devices.

The system also includes a baghouse temperature sensor and a baghouse pressure drop measuring device. For any particular gas stream of known density, the measurement of the baghouse pressure drop, temperature and the individual orifice pressure drop for each bag, provides the necessary information to determine individual bag flow and fabric drag.

The system also provides for the sequential timing of the measurements taken for each filter bag and means for recording all the collected data.

DETAILED DESCRIPTION OF THE DRAWINGS

Figure 1:
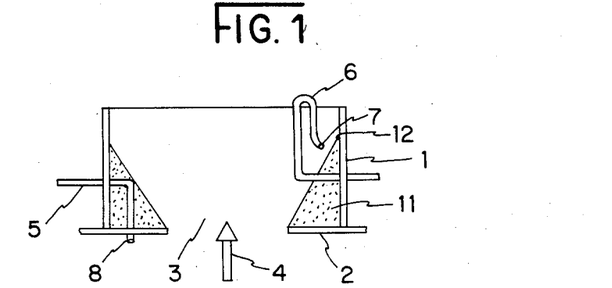
FIG. 1 shows a cross sectional view of a pressure sensor for a reverse air and shaker baghouse, which illustrates the position and configuration of the orifice pressure taps and sidewalls.
Figure 2:
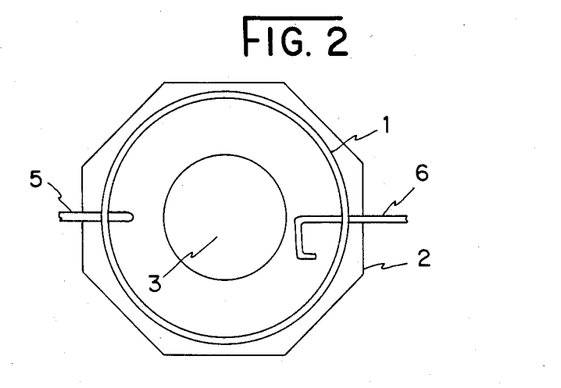
FIG. 2 shows an overhead view of a type of device shown in FIG. 1, as viewed from above the downstream side of the orifice.

A preferred embodiment of the individual filter bag pressure sensing device is shown in FIG. 1. The device shown in FIG. 1 is used in a reverse air and shaker baghouse system where inside-out dust collection is employed. The pressure sensing device of FIG. 1 has a tubular sidewall 1 and an orifice plate 2 containing orifice 3. The gas which is to be filtered passes through orifice 3 in the direction of arrow 4. A pair of pressure taps 5 and 6 are disposed with their openings 7 and 8 on either side of the orifice with the opening of tap 6 being on the downstream side and the opening of tap 5 being on the upstream side. Each pressure tap is made from tubing. Preferably, the tubing is ¼-inch stainless steel or copper. Tap 6 is designed with a trombone type loop to prevent dust from entering the opening 7 of the tubing during bag cleaning and to allow easier cleaning by the purge flow.

Figure 3:
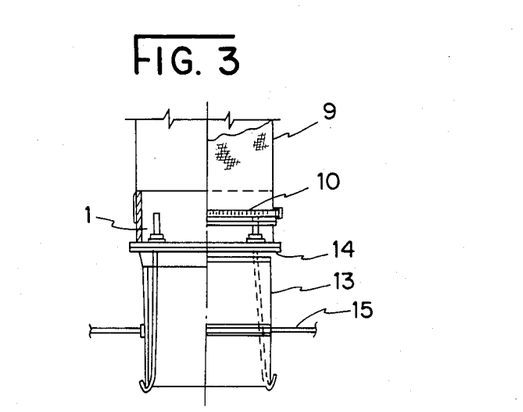
FIG. 3 illustrates a side elevational view of a typical installation wherein a pressure sensor of FIGS. 1 and 2 is installed within a baghouse.

The sidewall is adapted to receive a filter bag 9 which is shown in place in FIG. 3. An adjustable stainless steel clamp 10 may be used to retain the bag in place around the sidewall of the device.

FIG. 3 also illustrates the positioning of the pressure sensing device on top of an existing thimble assembly 13. Typically, a gasket 14 is used between the thimble assembly and the pressure sensor. Preferably a Teflon felted gasket is used. Existing tube sheet 15 is also shown in place.

Figure 4:
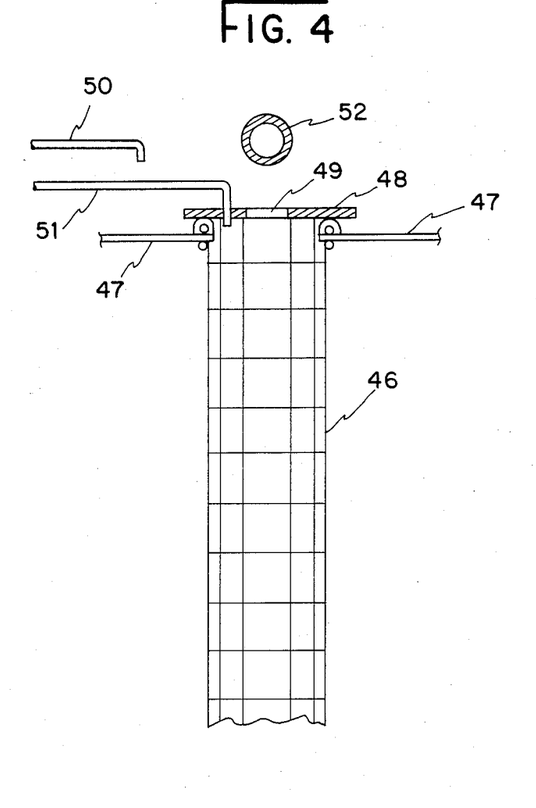
FIG. 4 shows a cross sectional view of a pressure sensor and attached bag in an outside-in flow pulse cleaned bag.

The individual filter bag sensor may be adapted for use in an outside-in flow, pulse cleaned baghouse. This type of sensor is illustrated in FIG. 4. FIG. 4 shows a filter bag 46, a tube sheet 47, an orifice plate 48 having an orifice 49 in the center thereof, a pair of pressure sensor taps 50 and 51, and a pulse jet pipe 52 for periodically cleaning the bag. It will be noted that in this adaptation, dust does not collect inside the bag and, as a result, it is not necessary to employ the trombone configuration for the sensor inside the bag. It will also be noted that sensor tap 51 is an upstream sensor since the flow is in the opposite direction relative to the direction of gas flow in inside-out bags.

In operation with reference to the sensor of FIG. 1, gas which contains dust particles passes through the orifice into the bag and through the bag fabric so that dust particles are filtered out of the gas. The dust particles become trapped inside the bag as the gas flows therethrough to the outside. Some dust particles will accumulate on the orifice plate around the orifice near the sidewall. The accumulated dust particles are indicated by reference numeral 11. The angle of repose is the angle which determines the slope of the accumulated dust. It is not more than about 45° with 45° being preferred.

Preferably, the pressure sensing device is constructed with sidewall 1 being higher than the height of the dust which is determined by the angle of repose of the accumulated dust. Thus, sidewall 1 is higher than the total height of the accumulated dust which extends up the sidewall to a point indicated by reference numeral 12. The high sidewall prevents the dust from building up against the fabric which would cause premature failure.

Preferably, the downstream pressure sensor tap 6 is located such that its open end 7 is above the maximum height of dust build-up. In this regard, it will be noted that this condition is satisfied even when the height at opening 7 is less than the height at 12 providing opening 7 is displaced to the left a sufficient distance from the sidewall so that it remains above the accumulated dust as determined by the dust's angle of repose. FIG. 1 illustrates such an arrangement where opening 7 is considered as being above the maximum height of the dust because at its position to the left of a sidewall, it lies above the dust due to the angle of repose of the accumulated dust.

The upstream sensor tap is located in a low or zero flow region outside the inlet flow pattern.

Each pressure sensor tap is connected to a solenoid valve, preferably a three-way solenoid valve, so that the source of purge air can be connected to the taps or, alternatively, the purge air can be cut off and the pressure measuring device can be connected to the taps to measure the pressure therein. Thus, it is possible to isolate the sensitive pressure measuring device from the purge air pressure pulse through use of the valve.

Figure 5:
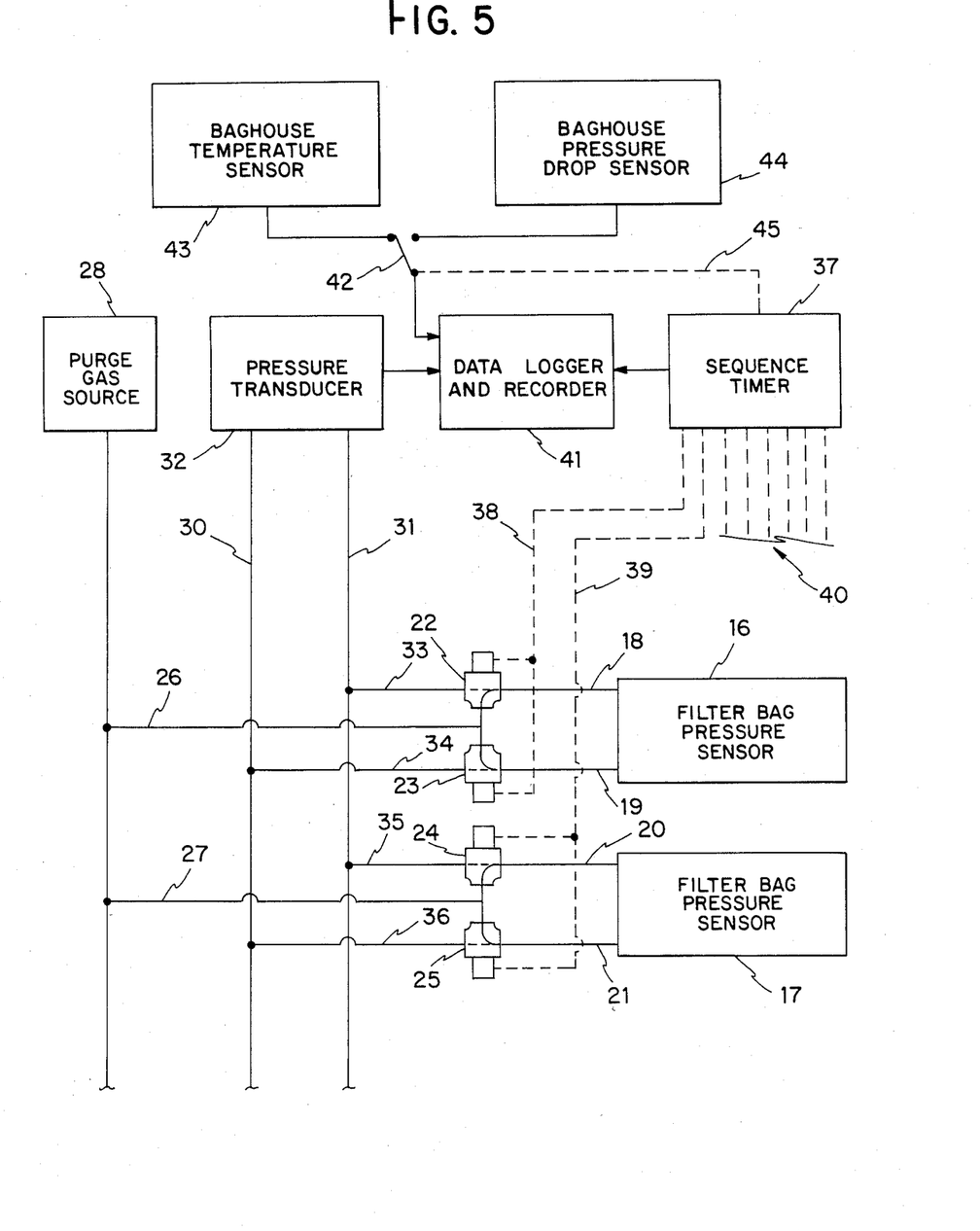
FIG. 5 is a schematic diagram which illustrates the relationship of individual pressure sensors with other elements of the system.

FIG. 5 illustrates the connections among the individual filter bag sensors, their pressure taps, the solenoid valves, purge gas, differential pressure transducer and other related parts. With reference to FIG. 5 it will be noted that two individual filter bag sensors are illustrated by reference numeral 16 and 17. In a reverse air baghouse, the sensors are of the type shown in FIG. 1. Although only two individual filter bag sensors are shown for the purposes of illustration, each of which has two pressure sensor taps, it is emphasized that a large number of sensors may be used in the system. In fact, a pressure sensing device may be installed for each filter bag in the baghouse.

Each pressure sensing device has a pair of pressure taps. Pressure tap lines 18 and 19 are shown coming from sensor 16 and another pair of pressure tap lines 20 and 21 are shown coming from sensor 17. Lines 18 and 20 are the upstream sensor taps and lines 19 and 21 are the downstream sensor taps. Pressure taps 18, 19, 20 and 21 are connected to three-way solenoid valves 22, 23, 24, and 25, respectively. When the solenoid valves are de-energized, the pressure tap lines become open to the purge gas lines 26 and 27 so that purge gas can pass through the valve and into the pressure taps. The purge gas lines originate from the purge gas source 28 which can be air. In order to assure that the purge gas flows from source 28 and through the lines and then through the pressure taps toward the individual filter bag sensors 16 and 17, it is important that the purge gas source be at a higher pressure than the pressure which exists at the open ends of the pressure taps near or in the sensor.

When the solenoid valves are energized, the purge gas is cut off so that the gas no longer flows through the sensor taps.

Each solenoid valve has a line leading therefrom which is connected to one of a pair of lines leading to a pressure transducer. For example, solenoid valve 22 is connected to line 33 which in turn is connected to line 31. Line 31 leads to pressure transducer 22. All of the upstream pressure sensor taps are similarly connected to a common line. Thus, upstream taps 18 and 20 are both connected to common line 31 through lines 33 and 35, respectively. Similarly, all the downstream pressure taps 19 and 21 are connected to a different common line 30 through lines 34 and 36, respectively. Common line 30 is also connected to pressure transducer 32.

When the solenoid valves are energized, lines 33, 34, 35 and 36 are open to each of their respective pressure sensor taps 18, 19, 20 and 21, while at the same time, the purge gas flow is cut off at the valves. Since the upstream lines and the downstream lines are separately connected to different lines leading to the differential pressure transducer, then the transducer will measure the pressure difference or pressure drop, dH, which exists between the upstream and downstream pressure taps.

When the solenoid valves are de-energized then the purge gas will enter the pressure taps and the lines leading to the pressure transducer will be cut off thus isolating the delicate pressure measuring device from the pressure pulse going through the lines. This condition is illustrated in FIG. 5 by showing that the valves are open to the purge gas by a solid line within the valves and the valves are cut off from the lines leading to the pressure transducer as indicated by the dotted line segments in the valves.

FIG. 5 also shows a sequence timer 37. The sequence timer is electrically connected to each pair of valves which serve an individual filter bag pressure sensor. Thus, the sequence timer is connected by wire 38 to valves 22 and 23 which serves sensor 16. Similarly, a second wire 39 is connected to valves 24 and 25 which serve sensor 17. The sequence timer can selectively energize or de-energize any given pair of valve since a separate wire is connected to each pair of valves. Thus, pressure drop, dH, can be obtained for each individual pressure sensor. Furthermore, all the individual measurements are taken with a single pressure transducer to minimize error which would occur it multiple transducers were used.

FIG. 5 also shows additional wires generally indicated by numeral 40. These additional wires are connected to additional valves which are not illustrated. All the wires are illustrated by dotted lines to indicate that all the valves are simultaneously being energized whereby the purge gas is flowing through the pressure taps. Such a situation would exist when the bags are being cleaned, or whenever they are not being monitored for pressure drop data. The purge gas passing through the sensor taps prevents dust from entering them.

Data from the pressure transducer is fed into a strip chart or data logger shown in location 41. Data from the sequence timer is also fed into the strip chart or data logger so that the data from the pressure transducer can be correlated with particular sensors being measured at a particular time.

FIG. 5 also illustrates a baghouse temperature sensor 43 and a baghouse pressure drop (dP) sensor 44. The temperature sensor and dP sensor are connected to a recorder at location 41. A switch 42 is controlled by the sequence timer through wire 45. When the switch is in one position, data from the baghouse temperature sensor is being fed to the recorder at location 41. When in the other position, data from the dP sensor is being fed to the recorder. The sequence timer activates switch 42 and valves 22, 23, 24 and 25 so that for each pressure drop measurement, dH, which is measured, there are also measurements of baghouse temperature or baghouse dP. This information which is recorded, is then used to calculate individual volumetric gas flow for each filter bag.

The sequence timer may be pre-programmed by means of a computer. If necessary, it is also possible to manually energize or de-energize the individual valves and switch 42 so that measurements of baghouse temperature, baghouse pressure drop (dP) and individual dH for each pressure sensor is thereby obtained. One can then calculate the volumetric flow and drag for each filter bag with these measurements given the particular density of the gas being filtered.

While the individual sensors provide the basis for obtaining some of the basic data used to monitor the baghouse and individual bags contained therein, the instrumentation is required to collect and analyze the data. The type of baghouse and the specific goals in a test program for evaluating the filter bags, will dictate whether manual, analog or automatic data logging instrumentation is required. These three types of systems are useful. They are model I, the manual system; model II, the dual channel analog system; and model III, the multi-channel digital data system.

All three systems monitor the three parameters required to determine an individual bag flow and fabric drag; temperature, orifice pressure drop (dH) and tube sheet pressure drop (dP). The manual model is designed specifically for evaluations where large amounts of continuous data is not required. These units work well for short term pulse jet system evaluations. This system consists of individual bag flow sensors designed specifically for each baghouse, an instrument module that provides manual selection of each individual filter bag sensor and simultaneous read-out of sensor pressure drop, module pressure drop and temperature.

The analog model is designed for evaluations where continuous, automatic data collection is required. It consists of individual filter bag sensors, usually ten, a signal conditioning module, a control and monitor module, and a ten-chart recorder. The sensor pressure drops are sequentially time shared on one pen while the module pressure drops and temperatures are time shared on another pen. This system requires substantial time to monitor all sensor points thus making it most useful for pulse jet applications where the filtration cycle is short.

The digital model is designed for evaluations where large amounts of simultaneous data collection are required. This system is especially useful for reverse air and shaker applications. This system consists of individual filter bag sensors, in multiples of up to 18, signal conditioning modules, a digital display module and a printer. Each sensor pressure drop, module pressure drop and module temperature measurement is simultaneously fed into a separate channel on the data logger. Scan rates are programmable. The data can be input to a computer for direct conversion to gas-to-cloth ratios and fabric drag versus time.

Figure 6:
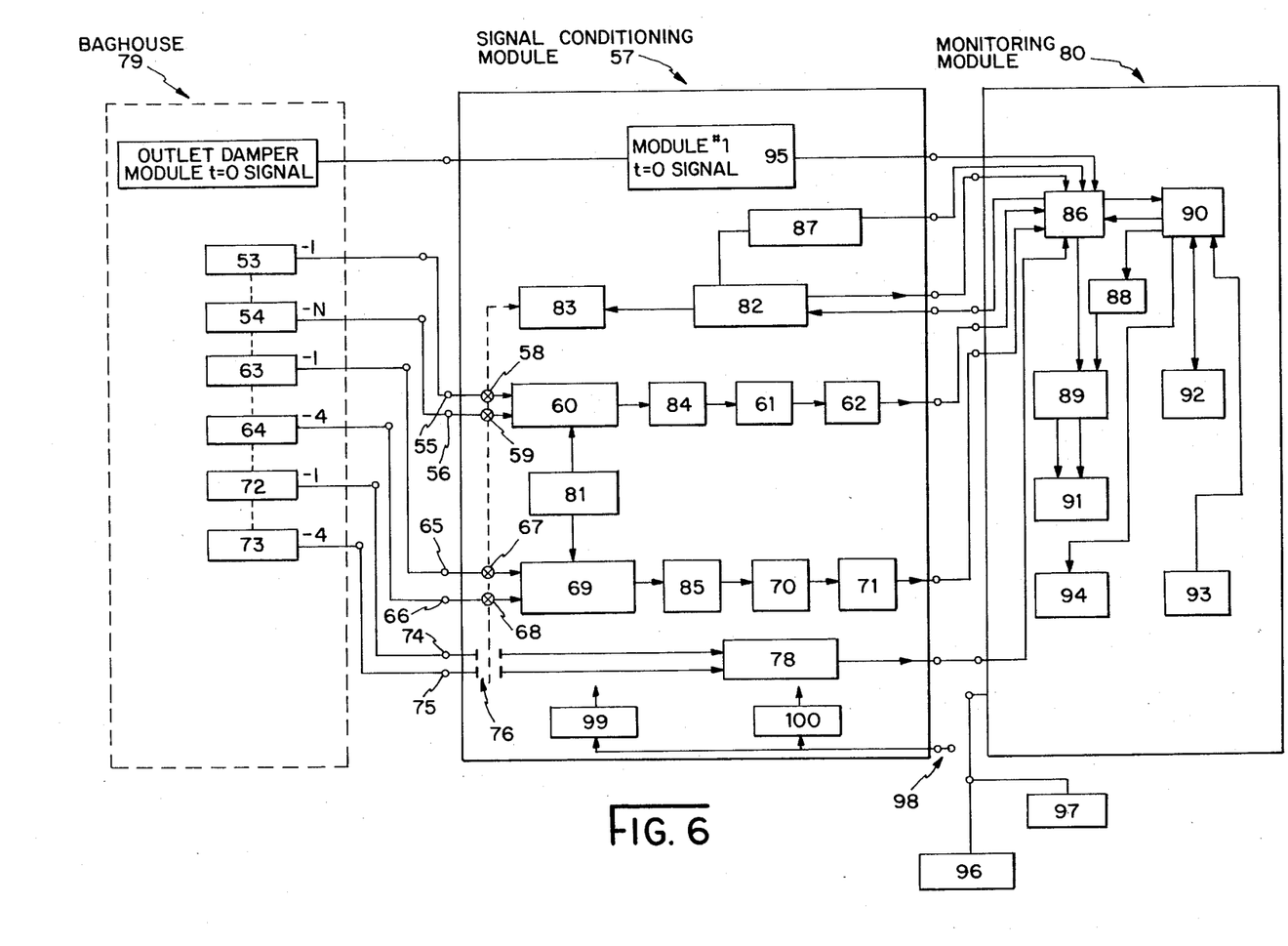
FIG. 6 is a functional schematic diagram of a complete individual bag flow monitor system which utilizes an individual bag pressure sensing device.

FIG. 6 illustrates a complete system for sensing, collecting monitoring, storing and analyzing individual bag gas flows at multiple bag locations within the same collector on a continuous, programmable basis utilizing computer based hardware and software. This system maintains the integrity of the sample lines, channels the information through common signal conditioning components, has a flexibility and capability of setting, adjusting and controlling the sample parameters and organizes and stores the data in digital form for easy analysis.

In FIG. 6 the baghouse is indicated generally by reference numeral 79. A signal conditioning module (SCM) is indicated generally by reference numeral 57 and a control and monitoring module (CMM) is indicated generally by reference numeral 80.

With reference to FIG. 6 it will be observed that the individual bag flow sensors 53 and 54 are attached to test bags inside the baghouse. The sensor taps are connected by tubing to the inlet ports 55 and 56 on a signal conditioning module (SCM) 57. Each sensor line passes through a solenoid controlled pneumatic valve illustrated by reference numerals 58 and 59 which is connected to a dH signal manifold 60. For pulse jet applications, only one manifold is required, the other side of the bag sensor being common and the same as the low dP signal. For reverse air and shaker type collectors, two dH signal manifolds are required. The manifold outlet(s) is connected to a differential pressure transducer 61 which converts the pneumatic signal to a reluctance signal. This is then fed to a demodulator module 62 which converts the signal to an electrical analog output proportional to the pressure drop across the orifice (dH).

Similarly, the tube sheet pressure drop signals from various baghouse modules are plumbed to the SCM inlet ports through solenoid valves, to the dP manifolds, to a differential pressure transducer and a second demodulator module. For example, FIG. 6 illustrates a pair of dP sensors 63 and 64 which generate a dP signal from a baghouse module which is plumbed to the SCM inlet ports 65 and 66 and then through solenoid valves 67 and 68 to the dP manifolds 69 to a differential pressure transducer 70 and a second demodulator module 71. This circuit produces an analog output voltage signal proportional to the pressure drop across the tube sheet of the module being monitored.

The temperature of each temperature zone is also sensed. FIG. 6 shows temperature sensors 72 and 73 which are preferably thermocouples. They are wired to the SCM inlet ports 74 and 75. Each thermocouple signal passes through a normally open relay 76 and to the temperature demodulator 78. The output signal from the temperature demodulator is a voltage directly proportional to the temperature within the monitored zone.

The purge air assembly 81 provides clean, positive pressure air to the normally open ports of the inlet valves 58 and 59 and to the general SCM instrument compartment area. This maintains a proper environment within the SCM and provides a source of purge air to the pressure sensor tap lines when not being monitored, to prevent dust and moisture accumulation or pluggage therein.

A sequence stepper 82 provides power to sequentially activate the solenoid valves and relays through a parameter patch board 83 which couples the corresponding dH, dP and T-values and relays for each individual filter bag sensor.

Since all sensors utilize the same signal conditioning components and all dP and temperature signals are fed through common conditioning components, any drift with time will affect all sensors and the relative relationship between individual bag flows will be maintained. A zero check is performed periodically utilizing zero check modules 84 and 85 which simultaneously open all manifolds to the atmosphere.

The SCM outputs simultaneously the dH, dP and T-voltage signals from the sensor selected for monitoring and inputs them to the I/O module 86 located in the control and monitoring module (CMM) 80. A signal identifying sensor #1 indicated by reference numeral 87 is supplied from the sequence stepper 82, and a signal identifying the start of the filtration cycle in module #'indicated by reference numeral 95 is also output from the SCM 57 to the CMM I/O module 86. This I/O module converts the analog signals to digital form and stores the data along with the identity of the individual filter bag sensor and the time obtained from a local clock 88 in local ROM 89. The I/O module receives its instructions from the control module 90. The control module directs the I/O module to read a set of SCM output signals following adjustable delay time, X number of times at a frequency of Y seconds. This data set is then averaged and output to the integral floppy disc 91 and stored for later retrieval in a ASCII character format. The control module is directed by custom operating software 92. A standard computer keyboard 93 is used to establish monitoring patterns and frequencies. A video monitor 94 allows manual readout of the sensors and displays the operating software and collected data.

The collected information can be stored locally on an integral memory disc, output to a local printer 96, or transmitted to a remote site via modem 97.

The data sets can then be manually converted to baghouse performance parameters or fed into a software analysis program entitled FLOW-TRAC which is available from ETS, Inc. The system is powered from a 110 VAC power source indicated by numeral 98 which in turn powers a 24 VDC power supply 99 and a 15 VDC power supply 100. Power supply 99 is connected to sequence stepper 82.

The entire system is useful to evaluate many potential baghouse design parameters including: fabric alternatives; bag-to-cage fits; effect of location within a module; effect of location within a baghouse system; cleaning energy variations; Venturis, diffusers; different pulse pipe designs; reverse air and shaker tensioning techniques; sonic horn evaluations; and on-line versus off-line cleaning.

Normally these evaluations will take place within one or more common compartments. The first step in the evaluation is to produce a layout of the bag position to be evaluated. The individual bag flow pressure sensors are then located at these positions and given a number. The next step is to define the alternatives to be evaluated. Preferably, a minimum of two sensors is used for each variable to provide data confirmation. The final step is to provide information allowing design of sensor pressure drop range and attachment scheme.

The above described system is referred to as an individual bag flow monitor (IBFM) because it measures the flow in individual bags within a baghouse. The sensors which measure the pressure drop across the orifice, dH, and therefore referred to as IBFM sensors.

The necessary IBFM orifice size is defined as follows:

$$D_i = \left( \frac{L_b D_b G/C}{43.5 \, C_v \sqrt{\Delta h \, (T + 460)}} \right)^{\frac{1}{2}}$$

Where:
$D_i$ = IBFM orifice dia., inches
$D_b$ = Bag dia., inches
$L_b$ = Bag length, inches
G/C = Gas-to-cloth, ft/min.
$C_v$ = Velocity coeff. from calibration (usually 0.80-0.85)
$\Delta H$ = IBFM pressure drop, inches of water
T = IGFM temperature, °F.

After selecting the orifice the following forms of this relationship are also useful:

$$h = \left( \frac{G/C \, L_b D_b}{43.5 \, D_i^2 C_v} \right)^2 \frac{1}{(T + 460)}$$

$$G/C = \frac{43.5 \, D_i^2 C_v}{L_b D_b} \sqrt{\Delta h \, (T + 460)}$$

The following equations and procedure are useful to analyze IBFM data and to use the data to predict the performance of a baghouse containing a full complement of bags identical to the one tested.

Constants: (Applicable to all IBFMs and for all data points in this test series)

(1) IBFM Sensor Flow Constant;

$$C_f \frac{Ft/Min}{(In - H_2O - °F)^{\frac{1}{2}}} = \frac{43.5 \, (d_s)^{2*}}{1*d} C_v$$

Where:
$d_s$ = IBFM sensor diameter, inches
$C_v$ = IBFM flow coefficient
l = Bag length, inches
d = Bag diameter, inches (2) Inlet dust concentration, grains/*actual* cubic foot = $C_I$
(3) Projected inlet dust concentration, gr/acf = $C_{pI}$
(4) Number of data points per filtration cycle = N
(5) G/C's for projected performance, Ft/Min = $(C/C)_A$, $(G/C)_B$, . . .
(6) Filtration cycle length for projected performance, Min = I.

DATA (at time interval, $t_i$)

(1) Filtration cycle identification (number)
(2) IBFM sensor signal, In-$H_2O$ = $dH_i$
(3) Tube sheet pressure drop, In-$H_2O$ = $dP_i$
(4) Gas temperature, °F. = $T_i$
(5) Time from last cleaning, min = $t_i$ PARAMETERS CALCULATED FROM DATA
(for time interval, $t_i$)

(1) $(G/C)_i = C_f [h_i*(T_i+460)]^{\frac{1}{2}}$ (2)
$$S_i = \frac{(dP - dH)_i}{(G/C)_i}$$

(3) $m_i = C_I*(G/C)_i*(t_i - t_{i-1})$ (4) $(K_2)_i = (S_i - S_{i-1})/m_i$

CALCULATED CYCLE AVERAGE PARAMETERS (1) $S = (1/N)*(S_1 + \ldots S_N)$ (2) $M = m_1 + \ldots m_N$ (3) $K_2 = (1/N)*[(K_2)_I + \ldots (K_2)_N]$ (4) $S_E = S - (M*K_2)/2$

PROJECTED PERFORMANCE

For the averaged characteristics of the test bag evaluated (for any one cycle) at an assumed $(G/C)_A$, an assumed inlet dust concentration of $C_{pI}$, and for a filtration cycle length of I minutes:

At time = 0

Tube sheet press-drop = $S_E*(G/C)_A$

At Time = I

Tube sheet press-drop = $S_E*(G/C)_A + C_I*K_2*[(G/C)_A]^{2}*I$

These two points can be connected with a straight line to define projected performance of the test bag for the measured cycle parameters. A complete baghouse of like bags would perform identically. The calculation can then be repeated for $(G/C)_B$, etc.

The following symbols which are used in this invention are described below:

| Symbol | Description | Units |
|---|---|---|
| $C_v$ | IBFM sensor coefficient | Dimensionless |
| $C_f$ | Sensor constant = $\frac{43.5(d_s)^{2*}C_v}{1*d}$ | $\frac{Ft/Min}{(In-H_2O-°F.)^{\frac{1}{2}}}$ |
| $C_I$ | Inlet dust concentration | Grains/Actual $Ft^3$ |
| $C^p_I$ | Projected $C_I$ | gr/acf |
| d | Bag diameter | Inches |
| $d_s$ | IBFM sensor diameter | Inches |
| dH | IBFM sensor signal | Inches of water |
| dP | Tube sheet differential pressure | Inches of water |
| G/C | Gas-to-cloth ratio | Ft/Min |
| $(G/C)_i$ | G/C at i | Ft/Min |
| i | Internal number | Dimensionless |
| I | Filtration cycle length | Minutes |

-continued

| Symbol | Description | Units |
|---|---|---|
| $K_2$ | Slope of $S_i$ versus $m_i$ | $\frac{\text{Inches-of-water}}{\text{Ft/Min}*\text{gr/Ft}^2}$ |
| $(K_2)_i$ | $K_2$ at i | $\frac{\text{Inches-of-water}}{\text{Ft/Min}*\text{gr/Ft}^2}$ |
| l | Bag length | Inches |
| M | Total dust per unit area | grains/Ft$^2$ |
| $m_i$ | Collected dust during i | grains/Ft$^2$ |
| N | Number of intervals per filtration cycle | dimensionless |
| S | Average fabric drag for one filtration cycle | $\frac{\text{Inches-of-water}}{\text{Ft/Min}}$ |
| $S_E$ | Drag extrapolated to start of filtration cycle | $\frac{\text{Inches-of-water}}{\text{Ft/Min}}$ |
| T | Gas temperature | Degrees Fahrenheit |
| $t_i$ | Time at i | Minutes | drop. Alternative fabrics appeared to be the best source of a solution.

The existing bag set utilized felted glass fabric referred to as fabric A. Four alternative fabric types were selected: (B) 16 oz. woven glass; (C) a new felted glass type; (D) Gortex on woven glass; and (E) Nomex felt. A test module was identified and the test locations established. Ten individual bag flow pressure sensors were installed with readout capability just outside the module. Flow restrictors were installed in the sensors to limit the G/C to two a maximum of 2/1 during bag break in. The final sensor's orifice was designed to operate at 2-inches thus allowing 10-inches plus a fabric dP.

Figure 7:
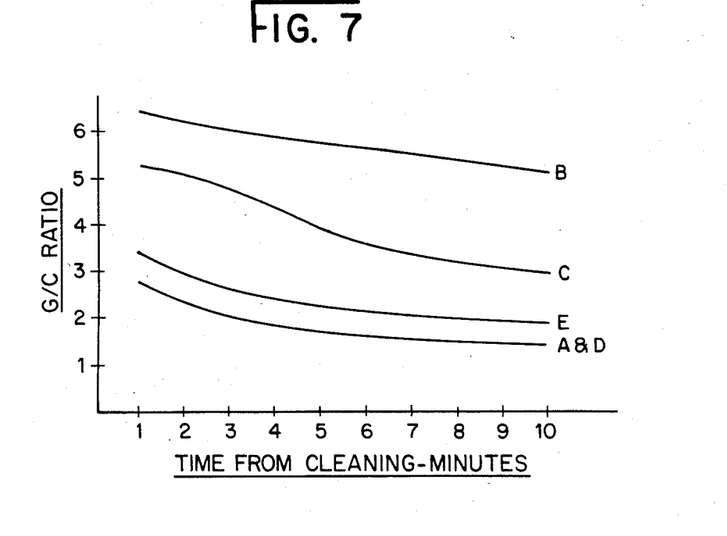
FIGS. 7 and 8 are graphs which illustrate data collected in Example 1.
Figure 8:
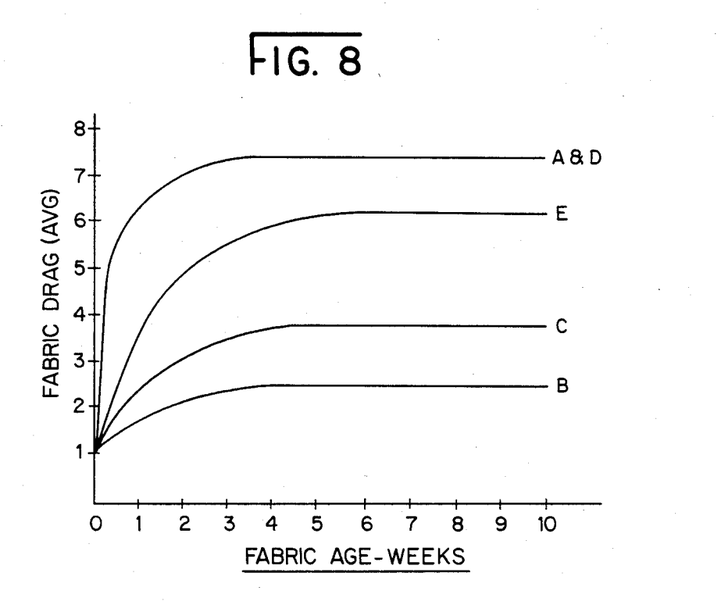

A manual model 10PJ-I system was used and data was collected on each individual bag flow pressure sensor and recorded as illustrated in Table 1. The data of Table 1 was analyzed for differences within a filtration cycle and over-exposure time as shown in FIGS. 7 and 8.

TABLE 1

| | | IBFM # | | | | | | | | | | |
|---|---|---|---|---|---|---|---|---|---|---|---|---|
| | | 1 | | | | 2 | | | | 3 | | |
| | | LOCATION | | | | | | | | | | |
| | | R4, C9 | | | | R5, C9 | | | | R6, C9 | | |
| | | VARIABLE | | | | | | | | | | |
| | | Present Felted Glass | | | | GoreTex on Woven Glass | | | | 16 oz. Woven Glass | | |
| | | RUN #/TIME | | | | | | | | | | |
| | | 4 - 10:00 AM | | | | 4 - 10:15 AM | | | | 4 - 10:30 AM | | |
| # | TIME MIN. | ΔP | Δh | $T_k$ | $\sqrt{\Delta h T_k}$ | ΔP | Δh | $T_k$ | $\sqrt{\Delta h T_k}$ | ΔP | Δh | $T_k$ | $\sqrt{\Delta h T_k}$ |
| 1 | 1 | 15.7 | .4 | 886 | 18.8 | 15.7 | 2.1 | 886 | 43.1 | 15.7 | 1.5 | 886 | 36.5 |
| 2 | 2 | 15.7 | .32 | 886 | 16.8 | 15.7 | 2.0 | 886 | 42.1 | 15.7 | 1.4 | 886 | 35.2 |
| 3 | 3 | 14.2 | .22 | 886 | 14.0 | 14.2 | 1.9 | 886 | 41.0 | 14.2 | 1.2 | 886 | 32.6 |
| 4 | 4 | 14.2 | .21 | 886 | 13.6 | 14.2 | 1.9 | 886 | 41.0 | 14.2 | 1.0 | 886 | 29.8 |
| 5 | 5 | 15.7 | .20 | 886 | 13.3 | 15.7 | 1.8 | 886 | 40.0 | 15.7 | .8 | 886 | 26.6 |
| 6 | 6 | 15.7 | .18 | 886 | 12.6 | 15.7 | 1.8 | 886 | 40.0 | 15.7 | .7 | 886 | 24.9 |
| 7 | 7 | 14.2 | .18 | 886 | 12.6 | 14.2 | 1.6 | 886 | 37.6 | 14.2 | .6 | 886 | 23.1 |
| 8 | 8 | 14.2 | .18 | 886 | 12.6 | 14.2 | 1.5 | 886 | 36.5 | 14.2 | .6 | 886 | 23.1 |
| 9 | 9 | 15.7 | .18 | 886 | 12.6 | 15.7 | 1.4 | 886 | 35.2 | 15.7 | .5 | 886 | 21.0 |
| 10 | 10 | 15.7 | .17 | 886 | 12.3 | 15.7 | 1.3 | 886 | 34.0 | 15.7 | .5 | 886 | 21.0 |
| AVERAGE | | 15.1 | — | — | 13.9 | 15.1 | — | — | 39.0 | 15.1 | — | — | 27.4 |
| G/C (AVG.) | | — | — | — | 2.04 | — | — | — | 5.73 | — | — | — | 4.03 |
| DRAG (AVG.) | | — | — | — | 7.4 | — | — | — | 2.63 | — | — | — | 3.75 |

$$\text{G/C (AVG.)} = \frac{43.5 \, D_i^2 C_v}{L \, D} \times \left[\sqrt{\Delta h T_k}\right]_{Avg.} = K \sqrt{\Delta h T_k}$$

WHERE:
$C_v$ = Orifice Flow Co-efficient = 0.85
$D_i$ = Orifice φ - Inches = 2
$L_b$ = Bag Length - Inches = 168
$D_b$ = Bag φ - Inches = 6
K = 0.147

$$(\text{Fabric Drag})_{Avg.} = \frac{\Delta P \text{ Avg.} - \Delta h \text{ Avg.}}{\text{G/C Avg.}}$$

FORM #1001

EXAMPLE I

Example 1 illustrates the in situ analysis of fabric alternatives in a foundry cupola pulse jet baghouse. The analysis was conducted because of a problem which developed in the baghouse. The existing bag set developed a 15-inch water gauge dP within one week of use. This condition repeated the experience of the initial set of bags. The objective of the analysis was to determine if alternate fabrics would provide a stable dP in the 4 to 8-inch water gauge range.

The baghouse was thoroughly inspected and all components were found to be properly designed, installed and in good operating condition. The design G/C ratio of 4.0 did not appear unreasonable. The present actual G/C was less than 2.0 due to the excessive pressure FIG. 7 shows the G/C versus time graph for each of fabrics A through E, and FIG. 8 shows the fabric drag versus fabric age for each of fabrics A through E.

The potential solution to this particular problem was evident very quickly. Additional monitoring, including fabric strength testing would be required to determine long term flow stability and fabric life. However, a decision to install the Goretex on woven glass bags was made following only a few months of testing.

EXAMPLE II

Example II shows the analysis of new fabric development for a reverse air baghouse. In Example II, a program was developed to evaluate limited yardage of several variations of an experimental fabric on a full scale application. The objective was to determine the short and long term flow and strength retention capabilities of these new fabrics versus standard fabrics.

Seventy-one full size bags made of three experimental fabrics and standard woven glass fabric were installed in one module of an operating reverse air baghouse filtering flue gas from a pulverized coal-fired boiler. After seven and a half months of continuous operation, two of the three new fabrics have shown no failures. Bags constructed of the failed fabric were removed after one month of operation.

Individual bag flow and pressure drop of twenty test bags have been monitored by a model II individual bag flow pressure sensing system. Model II employs a 2-pen chart recorder.

Figure 9:
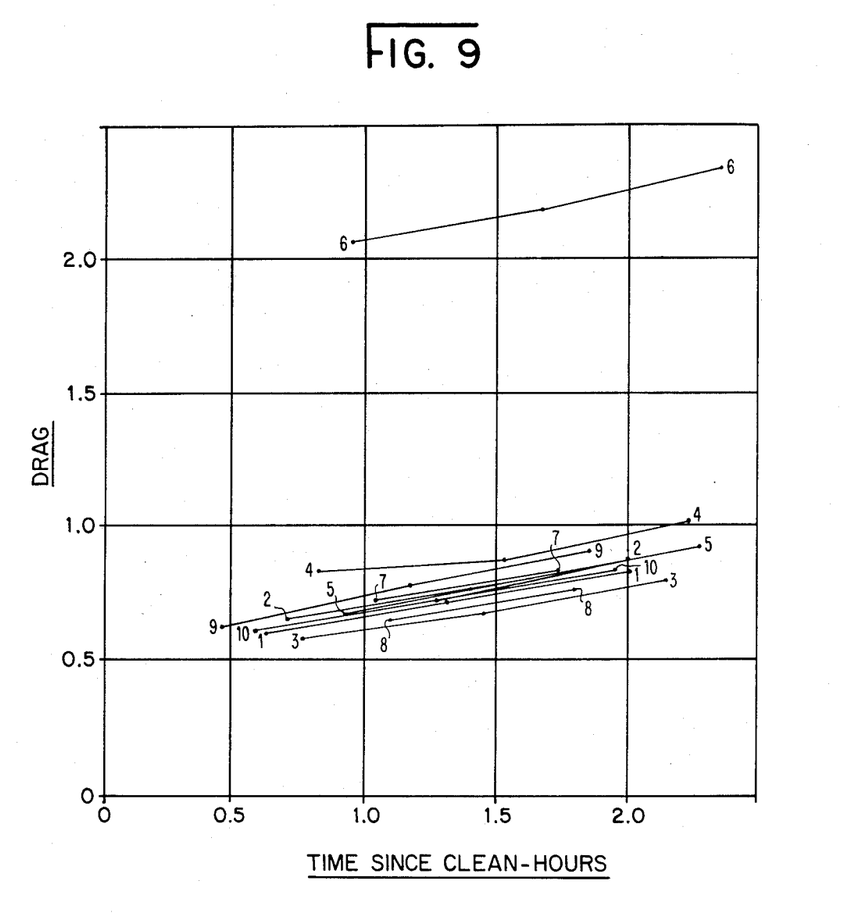
FIG. 9 shows a graph which illustrates analysis of data obtained from a strip chart recorder in Example 2.

From the data recorded in the strip chart recorder, individual bag gas-to-cloth ratio and fabric drag were calculated. FIG. 9 shows a typical analysis of the strip chart data. It presents a snapshot comparison of the individual bag flow for the fabric types by plotting the fabric drags versus time from cleaning. Two styles of experimental fabric, the 5-year old existing bag set, and new woven glass bags of the same style as the original bag set were monitored.

Figure 10:
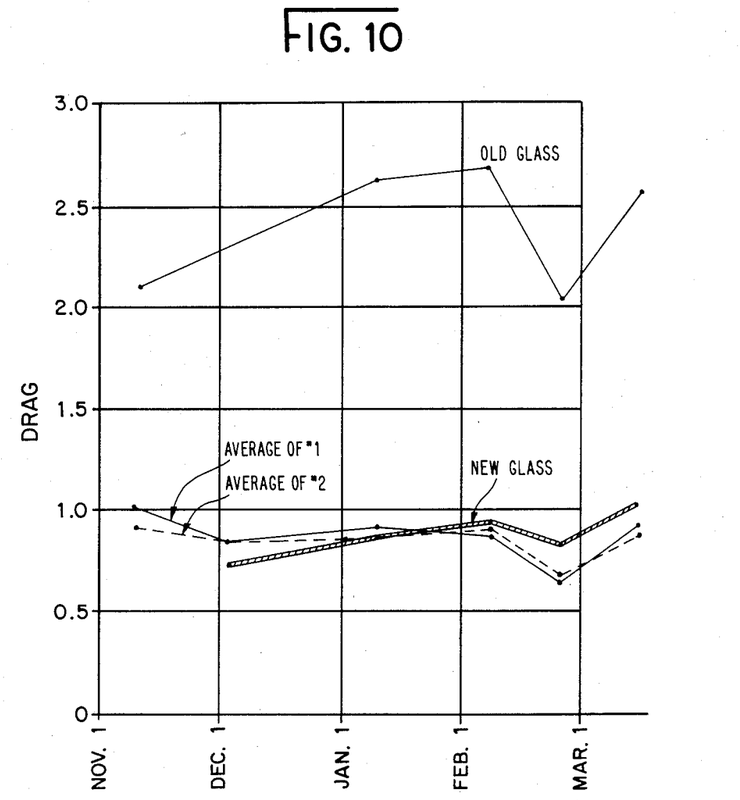
FIG. 10 is a graph which shows averaged fabric drag data collected in Example 2.

FIG. 10 presents average fabric drag data for the most recent four months of the program. The instantaneous fabric drag at one hour after cleaning has been used to compare the test variables. This drag has stabilized at an average value of 0.9 for the new fabrics compared to a value 2.4 for the 5-year old woven glass bags. The new woven glass bags were observed to rise about 30% (from 0.7 to 1.0), during the first three months of operation. The stable, low drag of the new fabrics, if continued, would be a valuable characteristic and demonstrates excellent cleanability of the new fabric.

We claim:

1. An apparatus for taking filter bag pressure measurements which comprises:
    (a) a chamber formed from a tubular sidewall having an upper open end and a bottom end, said bottom end being sealed with an orifice plate having an orifice for the passage of a gas stream therethrough upwards toward the open end;
    (b) an upstream pressure sensor tap comprising a tube having an opening no higher than the bottom of the orifice plate, said opening being located between the orifice and the sidewall whereby the tap opening is substantially out of the flow stream;
    (c) a downstream pressure sensor tap comprising a tube having an opening inside the chamber, said tap being bent in the configuration of a loop with the open end pointing downward, said open end being located at an elevated point between the orifice and the sidewall whereby the opening is above the orifice plate and substantially outside of the flow path.

2. The apparatus of claim 1 wherein the tubular sidewall is cylindrical.

3. The apparaus of claim 2 wherein the sidewall is higher than the height which can be achieved by a pile of dust on the orifice plate against the sidewall, said height of the pile of dust being determined by the angle of repose thereof.

4. The apparatus of claim 3 wherein the downstream pressure tap opening is above the maximum height of the dust directly below the opening, said maximum height being determined by the angle of repose of the dust.

5. The apparatus of claim 1 wherein the upstream pressure tap is connected to a first valve and the downstream tap is connected to a second valve; said first valve also being connected to a first line leading to a differential pressure measuring device and said first valve also being connected to a line leading to a purge gas source; and said second valve also being connected to a second line leading to the differential pressure measuring device and said second valve also being connected to the line leading to the purge gas source; and said apparatus further comprises means for opening and closing the valves to the purge gas and means for opening and closing the valves to the lines leading to the differential pressure measuring device; whereby when a valve is in one position, the line leading to the pressure measuring device is cut off and purge gas flows into the pressure tap and when a valve is in the other position, the purge gas is cut off and the line leading to the pressure measuring device is open to the pressure tap.

6. The apparatus of claim 5 wherein the valves are three-way solenoid valves.

7. The apparatus of claim 6 wherein the pressure measuring device is a differential pressure transducer.

8. An apparatus for the in situ measurement of volumetric flow through, an individual bag in a baghouse containing a plurality of filter bags, which comprises:
    (a) a plurality of pressure sensors each of which is attached to a different bag; each of said sensors comprising an orifice plate attached to the open end of the bag; and a pair of pressure taps; one tap being an upstream tap located on one side of the orifice plate and the other tap being a downstream tap being located on the other side of the orifice plate;
    (b) a plurality of upstream three-way solenoid valves, each of which is connected to a different upstream pressure tap so that each upstream pressure tap from each sensor is connected to only one valve;
    (c) a plurality of downstream solenoid valves each of which is connected to a different downstream pressure tap so that each downstream pressure tap from each sensor is connected to only one valve, thereby forming a pair of valves for each pair of pressure taps;
    (d) a purge gas source which is connected to the upstream and downstream solenoid valves;
    (e) a differential pressure transducer having an upstream line and a downstream line wherein the upstream line is connected to all of the upstream valves and the downstream line is connected to all of the downstream valves;
    (f) means for activating each pair of valves which serve a single sensor so that for each pair, the valves are either in one position wherein the purge gas flows into the tap while the same tap is cut off from the pressure transducer line, or are in the other position wherein the purge gas flow is cut off from the tap while the tap is connected to the pressure transducer line;
    (g) a baghouse temperature sensor for measuring the gas temperature inside the baghouse;
    (h) a baghouse tube sheet pressure drop sensor;
    (i) a recorder connected to the temperature sensor, the pressure drop sensor, and the differential pressure transducer, for recording the baghouse temperature, the baghouse pressure drop and the differential pressure at each sensor.

9. The apparatus of claim 8 wherein the means for activating each pair of valves is a sequence timer which is electrically connected to each pair of valves so that the valve position of each pair may be sequentially activated.

10. The apparatus of claim 9 wherein the baghouse temperature sensor and the baghouse pressure drop sensor are connected to the recorder through a switch which is activated by the sequence timer.

11. The apparatus of claim 10 wherein data from the sequence timer is fed to the recorder and recorded therein.

12. An apparatus of claim 8 wherein the sequencing of the valves and the output of the pressure transducers and temperature sensors are controlled and stored using digital processing hardware and software.

* * * * *